UNITED STATES PATENT OFFICE.

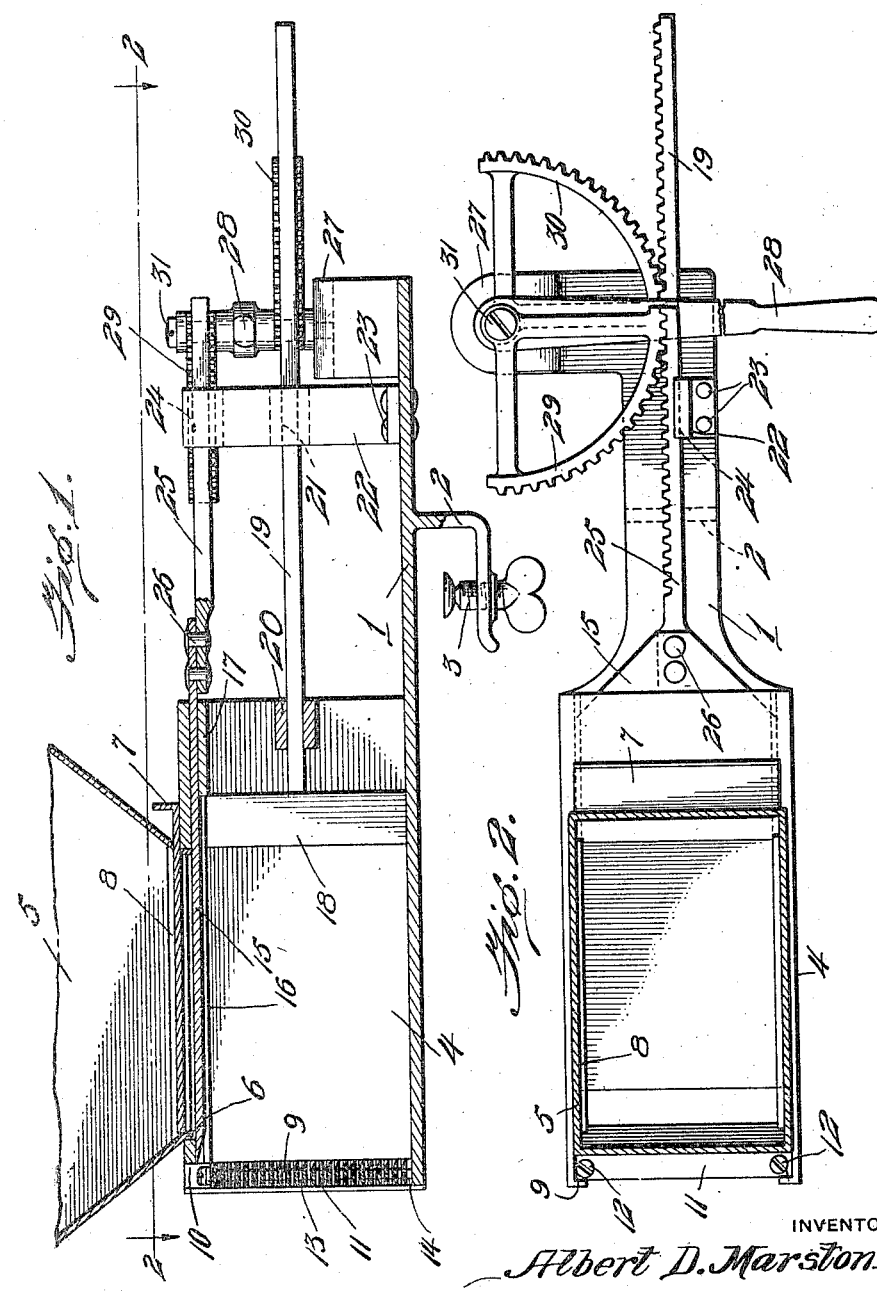

ALBERT D. MARSTON, OF WHITING, KANSAS.

GEARING FOR SLICING-MACHINES OR THE LIKE.

1,228,578.

Specification of Letters Patent.

Patented June 5, 1917.

Application filed August 9, 1916. Serial No. 114,043.

*To all whom it may concern:*

Be it known that I, ALBERT D. MARSTON, a citizen of the United States, residing at Whiting, in the county of Jackson and State of Kansas, have invented certain new and useful Improvements in Gearing for Slicing-Machines or the like, of which the following is a specification.

This invention relates to vegetable cutters and more particularly has reference to a potato slicing machine.

As the primary object, this invention contemplates the provision of a device whereby potatoes, apples, and other vegetables and fruits may be cut into various sized slices in a convenient and expeditious manner.

It is another object of the invention to provide a casing with a cutting means in one end thereof and a feeding hopper over and in communication with the casing, improved means being provided for alternately opening and closing the hopper and for forcing the contents of the casing through the cutting means, the forcing means operating when the supply to the casing is closed.

Another object of this invention resides in the provision of novel means for alternately reciprocating the closure blade of the supply hopper and the plunger or piston head.

It is a more specific object to provide means for closing the supply hopper when desired; to provide means whereby the cutting means may be adjustably spaced from each other; and to provide means for guiding the rack bars during operation.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a longitudinal section of my invention.

Fig. 2 is a section taken on line 2—2 of Fig. 1 in the direction in which the arrow points.

Referring more particularly to the drawings in which similar reference numerals designate like and corresponding parts throughout the different views, I provide a base plate 1, from the under surface of which extends a bracket arm 2, a clamp screw 3 operating in this arm for removably holding the base in engagement with a suitable support. A rectangular casing 4 is formed on one end of the base 1 while a feeding hopper 5 has its lower end arranged through an opening 6 in the top of the casing. A slide 7 is slidably mounted above the upper surface of the casing in the hopper 5, the sliding movement thereof being controlled by means of spaced guides 8. The sides of the casing adjacent the outer end thereof are provided with oppositely disposed vertical slots 9 which communicate with the slot 10 in the top of the casing so as to removably receive my improved cutting means.

The cutting means in this instance consists of a plurality of superposed spaced knives 11 held together by elongated bolts 12 being adjustably spaced from each other by means of washers 13. Nuts 14 are connected on the outer ends of the bolts for holding the cutting knives in position.

Slidably mounted beneath the top of the casing is a large cutting blade 15 the reciprocating movement of which is guided by means of guides 16 connected to the sides of the casing and also by a transverse bar 17 arranged adjacent the inner opened end of the casing. A plunger or piston head 18 is also arranged within the casing and conforms to the contour thereof. A rack bar 19 extends from the plunger head 18 and is slidably arranged between the boxing 20 the outer end being slidably arranged in a transverse guiding groove 21 in a support 22 perpendicularly mounted on the base 1 as indicated by the numeral 23. This support 22 is also provided adjacent its upper edge with another transverse groove 24 which guides the reciprocating movement of the rack bar 25 connected by suitable fastening devices 26 to the large blade 15 which as will hereinafter appear controls the feeding of the hopper.

For the purpose of alternately reciprocating the closure blade 15 and the plunger head 18, I have formed integral with the base plate a supporting bracket 27 which extends laterally from the plate and has rotatably mounted thereon an operating handle 28. Segmental gears 29 and 30 are integral with the inner end of the handle on opposite sides thereof, the handle being rotatably connected to the bracket 27 through the medium of an elongated screw bolt 31. It is to be noted that these segmental gears are only quarter circular. This arrangement is such that it causes the blade 15 and the plunger 16 to reciprocate alternately with each other. In other words, when the segmental rack 29 meshes with the rack bar 25 the blade 15 will be moved forward to close the feeding hopper 5 and stops since the segmental rack 29 passes out of mesh with the rack bar 25. Immediately the segmental rack 30 meshes with the rack bar 19 causing the plunger head to force whatever vegetables are within the casing through the cutting means.

The operation of my invention is as follows:—

Assuming that the base is connected to a suitable support by the clamping screw 3 and that the hopper 5 is filled with vegetables such as potatoes the slide 7 is opened and the lever 28 is moved away from the casing causing the segmental gear to mesh with the rack bar 25 and withdraw the knife so as to allow the casing to become filled. The movement of the lever is now reversed to close the knife blade 15 and as soon as this is accomplished the segmental gear 30 meshes with the rack bar 19 to consequently force the plunger head 18 through the casing, and at the same time force the potatoes through the blades 11 of the cutting means. This may be repeated until a desired quantity of vegetables have been sliced.

Although I have shown and described the preferred embodiment of my invention I desire it to be understood that I am not to be limited to the exact details shown, however, I desire that great stress be laid upon the novel means for alternately reciprocating the blade 15 and the plunger head 18 as well as the cutting means which coöperates with the plunger head for efficiently and expeditiously slicing vegetables.

From the above description taken in connection with the accompanying drawing, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus described my invention, what I claim as new and desire to secure by Letters Patent, is:

1. As a means for moving elements in timed relation with each other, a pair of slidably mounted rack bars each adapted to be associated with an element, means for guiding the sliding movement of the bars, a rockably mounted lever, segmental gears carried by the lever and positioned so that one will engage one rack bar when the other gear becomes disengaged from the other rack bar.

2. As a means for moving two elements in timed relation with each other, a pair of slidably mounted rack bars one of which is longer than the other while each is adapted to engage an element, a bracket provided with means for slidably receiving and guiding the movement of the bars, a rockably mounted lever, segmental gears carried by the inner end of the lever on opposite sides thereof and projecting from the lever to engage the rack bars, and the segmental gears being arranged so that when the lever is rocked in one direction from a middle position one rack bar will be reciprocated while the other rack bar will remain stationary, and when the lever is rocked in an opposite direction the first mentioned rack bar will remain stationary while the other rack bar will be reciprocated.

In testimony whereof I affix my signature in presence of two witnesses.

ALBERT D. MARSTON.

Witnesses:
C. D. LUECK,
OTTO LUECK.